United States Patent [19]
Duncan

[11] Patent Number: 5,721,948
[45] Date of Patent: Feb. 24, 1998

[54] SYSTEM FOR CREATING MOUNT COMMAND FROM VERIFIED PROGRAMMABLE OPTIONS COMPATIBLE WITH FILE SYSTEM TYPES TO ATTACH MEDIA FILE SYSTEM TO AN EXISTING FILE SYSTEM

[75] Inventor: William L. Duncan, Colorado Springs, Colo.

[73] Assignee: Sun Microsystems, Inc., Mountain View, Calif.

[21] Appl. No.: 608,756

[22] Filed: Feb. 29, 1996

[51] Int. Cl.$^6$ .................................................. G06F 15/40
[52] U.S. Cl. ........................................ 395/825; 395/500
[58] Field of Search .............................. 395/500, 616, 395/620, 621, 613, 615, 670, 672, 651, 652, 653, 825

[56] References Cited

U.S. PATENT DOCUMENTS

| | | | |
|---|---|---|---|
| 5,247,683 | 9/1993 | Holmes et al. | 395/200.51 |
| 5,257,387 | 10/1993 | Richek et al. | 395/284 |
| 5,317,728 | 5/1994 | Tevis et al. | 395/620 |
| 5,341,499 | 8/1994 | Doragh | 395/681 |
| 5,363,487 | 11/1994 | Willman et al. | 395/828 |
| 5,423,018 | 6/1995 | Dang et al. | 395/486 |
| 5,561,799 | 10/1996 | Khalidi et al. | 395/616 |

FOREIGN PATENT DOCUMENTS 0415 346A  3/1991  European Pat. Off. .

OTHER PUBLICATIONS

IBM Technical Disclosure Bulletin, vol. 31, No. 8, Jan. 1989, New York, U.S., pp. 182–184 "Method to Manage Network Machine Start–Ups".

*Primary Examiner*—Moustafa M. Meky
*Attorney, Agent, or Firm*—William J. Kubida; Homer L. Knearl; Holland & Hart LLP

[57] ABSTRACT

Programmable options for a mount command are checked for compatibility with file system types when attaching a media file system to a existing file system in a computing system. The options are programmed into a mount entry in a configuration file. The configuration file is used to generate the mount command. The mount entry defines file system types for the media file system and programmable options to control operation of the computing system with the media file system. The file system types, the programmable options and the compatibility of the programmable options with the file system types are all verified.

14 Claims, 7 Drawing Sheets

SYSTEM FOR CREATING MOUNT COMMAND FROM VERIFIED PROGRAMMABLE OPTIONS COMPATIBLE WITH FILE SYSTEM TYPES TO ATTACH MEDIA FILE SYSTEM TO AN EXISTING FILE SYSTEM

BACKGROUND OF THE INVENTION

1. Field of the Invention

This invention relates to programmable options for attaching a file system on a transportable storage media to a file system in a computing system. The invention provides programmable control options that are operative with the media file system being attached to the file system in the computing system.

2. Description of Related Art

In UNIX operating systems such as the SOLARIS operating system provided by SUN Microsystems, Inc., a volume management utility referred to as a removable media mounter, is used to manage the mounting and unmounting of removable media. Further the mounting of removable media involves attaching a file system on the removable media to the existing file system of a computing system in which removable media is attached.

It is very desirable to be able to provide programmable options selected by a user that could be loaded into the computing system at the same time the media's file system is attached to the existing file system. These programmable options might include controls such as read-only and no-set-user-id which would control the computing system's operation with the media file system after the media file system is attached.

Other file operations exist that allow a user to provide programmable options. For example, a share files command exists that allows a user to specify files to be shared by multiple applications. Further, the user may program options into the share configuration information to control how the computing system manages the sharing of the files.

In the case of applying programmable options to a mount command, a problem arises in that a user might easily create a programmable option that works with some file systems and not others. Accordingly, simply adding options to a mount command is not a viable way to provide programmable options in a mount command.

SUMMARY OF THE INVENTION

In accordance with this invention, the above problem has been solved by verifying programmable options compatibility with file system types when attaching a media file system to an existing file system in a computing system. In one embodiment this is accomplished through the computer implemented steps beginning with reading a mount entry from a configuration file. The mount entry defines file system types for the media file system and programmable options to control operation of the computing system with the media file system. The file system types, the programmable options and the compatibility of the programmable options with the file system types are all verified. After the verifying step, a mount command with an option string is created to attach the media file system to the existing file system. The option string specifies the programmable options verified by said verifying step. The mount command with option string is executed to attach the media file system to the existing file system so that the computing system operates the media file system in accordance with programmable options.

The verifying step begins by first comparing the file system type from the mount entry to a list of valid file system types and indicating the file system type as a legal file system type if the file system type matches one of the valid file system types. Also the programmable options are verified by comparing the programmable option from the mount entry to a list of valid programmable options and indicating the programmable option as a legal programmable option if the programmable option matches one of the valid programmable options. Finally, the legal programmable option is compared against the legal file system type to verify that the programmable option is compatible with the legal file system type. Each verified programmable option from the mount entry is checked against all verified file system types from the mount entry to determine that each verified programmable option is compatible with at least one of the verified file system types.

As a further feature of the invention the comparing steps comprise getting each file system type from the mount entry; type comparing each file system type to a list of legal file system types and producing a verified file system type for each file system type that matches a legal file system type; getting each programmable option from the mount entry; option comparing each programmable option to a list of legal programmable options and producing a verified programmable option for each programmable option that matches a legal programmable option. With the verifications accomplished, a pattern entry is written in a mount data structure for each mount entry. The pattern entry has a pattern identifier from the mount entry, verified file system types and verified programmable options.

As another feature of the invention the checking step begins by reading the pattern entry from the mount data structure. After getting all of the verified file system types and each verified programmable option, the compatibility of each verified programmable option with all of the verified file system types is tested to produce a compatible option used in creating the mount command. The compatible option is converted to a option string in the mount command to attach the media file system to the existing file system.

The above computer implemented steps in another implementation of the invention are provided as an article of manufacture, i.e. a computer storage medium containing a computer program of instructions for performing the above described steps.

In a machine implementation of the invention apparatus for compatibility checking programmable options with file system types, when attaching a media file system to an existing file system in a computer, has a parse module scanning a configuration file to read mount entries from the configuration file. Also, a configuration mount module builds a mount data structure from the mount entries read by said parse module. The mount data structure has a pattern entry for each mount entry, and each pattern entry has a pattern identifier, and at least one verified file system type and at least one verified programmable option. A hard mount module sets a mount option indicator for each verified programmable option in a pattern entry if the verified programmable option is compatible with at least one of the verified file system types in the pattern entry. This enables creation of a mount command to attach the media file system associated with the pattern entry in accordance with programmable options indicated by the mount option indicators.

The configuration mount module has type scan module, a option scan module and a write module. The type scan module scans the file system types in a mount entry to detect if each file system type is a legal file system type. The option scan module scans the programmable options in a mount entry to detect if each programmable option is a legal programmable option. The write module writes into memory a pattern entry for each mount entry. The pattern entry has a pattern identifier from the mount entry, verified file system types detected as a legal file system type from the mount entry by the type scan module and verified programmable options detected as legal programmable options from the mount entry by the option scan module.

The hard mount module has a retrieve module and a testing module. The retrieve module retrieves all the verified file system types and each verified programmable option from the pattern entry. The testing module checks the compatibility of each verified programmable option retrieved from the pattern entry with all the verified system types from the pattern entry. The option setting module sets an option indicator for each programmable option compatible with at least one of the verified file system types.

The great advantage and utility of the present invention is the user may program options into the mount command by inserting them in a configuration file for media identified by a pattern identifier. These options are then used by the computing system when operating on the media file system being attached to the computing file system by the mount command. Further, the invention verifies the legitimacy and compatibility of the options provided by the user.

The foregoing and other features, utilities and advantages of the invention will be apparent from the following more particular description of a preferred embodiment of the invention as illustrated in the accompany drawings.

DETAILED DESCRIPTION OF PREFERRED EMBODIMENTS

The embodiments of the invention described herein are implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps or modules.

Figure 1A:
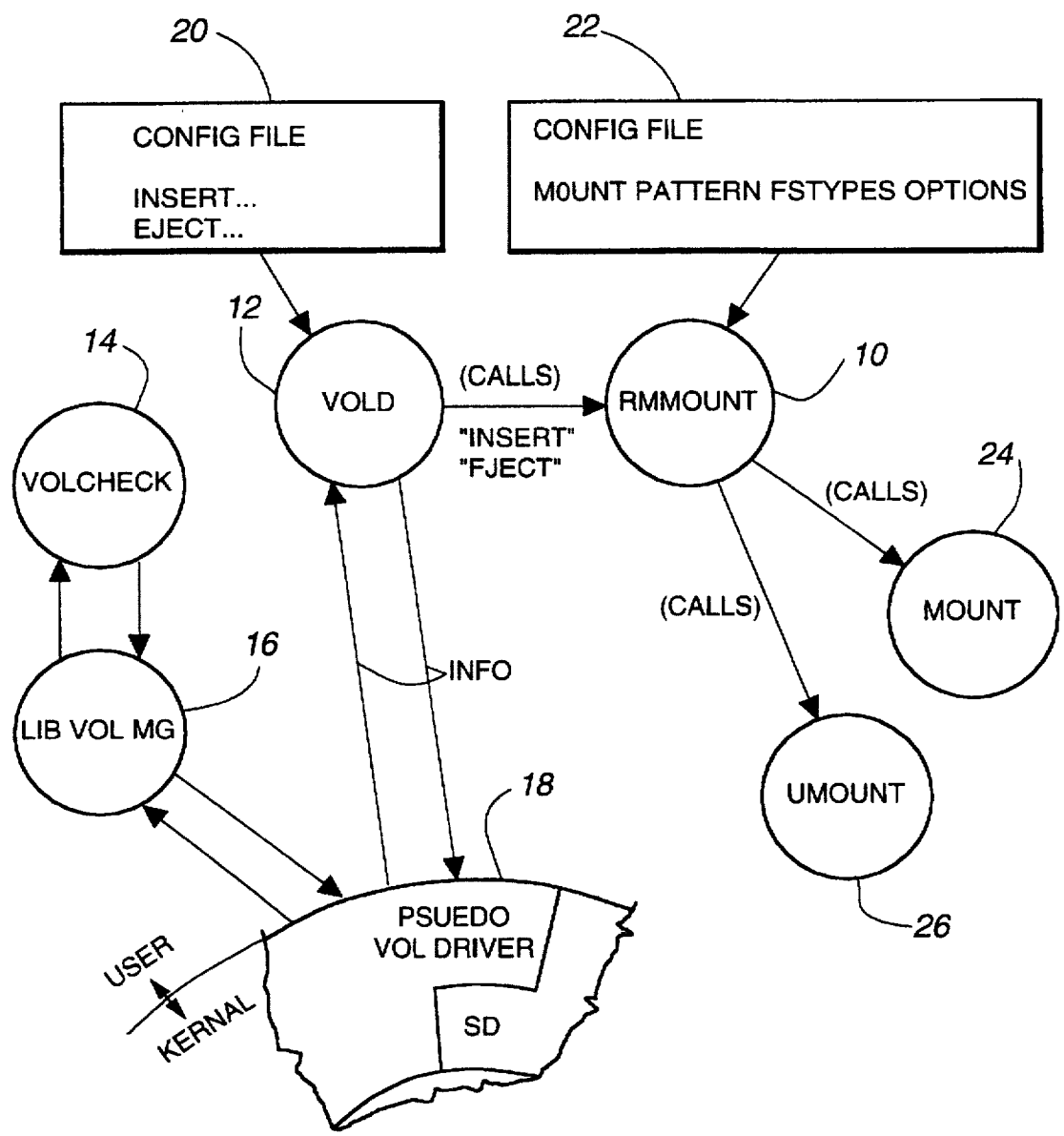
FIG. 1A illustrates an overview of the operations in one embodiment of the invention to mount removable media with a file system.

FIG. 1A illustrates a volume management system in a UNIX environment which makes use of a remote media mount (rmmount) operation in accordance with the preferred embodiment of the invention. The rmmount operation 10 receives calls from the volume daemon 12 when removable media is inserted in or ejected from a media device such as a CD-ROM drive, a floppy disk drive or interchangeable hard disk drive. The insert operation is the primary operation of interest to the options provided by the present invention.

In an insert operation, the volcheck utility 14 signals an insert operation through the library volume management 16 and the pseudo volume driver 18 to the volume manager, or vol daemon, 12. The volume manager 12 retrieves the insert configuration file 20 which provides such information as how to identify media, and what programs to call under certain conditions. The volume manager 12 then passes an insert call with information about the volume that has been inserted to rmmount operation 10.

The rmmount operation 10 retrieves configuration entries in its configuration file 22 and builds a mount command that is used to call the mount operation 24.

A similar process for the eject operation occurs with an eject utility signaling through the volume driver 18 to volume daemon 12 to build a eject call based on the request from the utility and on the eject configuration entry in the configuration file 20. This eject call is passed to rmmount 10 that generates the appropriate unmount command for the unmount operation 26.

Figure 1B:
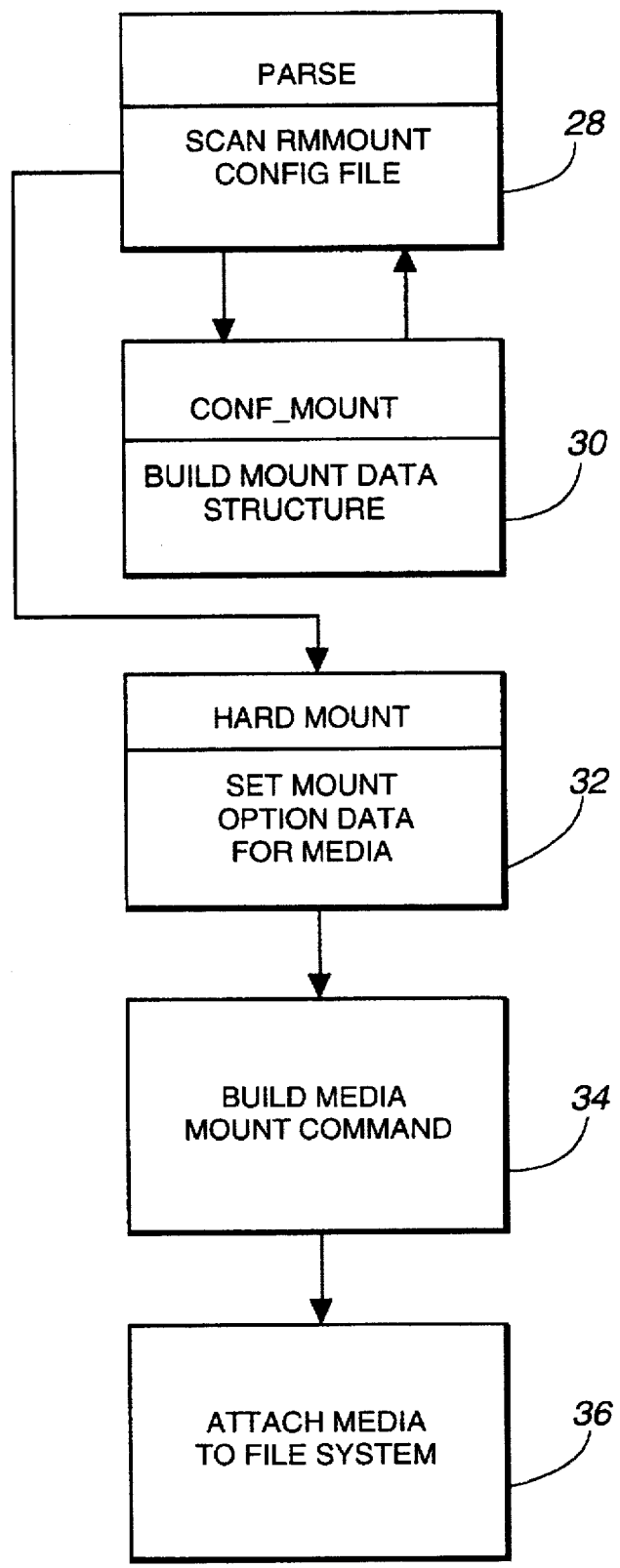
FIG. 1B illustrates the logical operations performed by the rmmount operation 10 and the mount operation 24 in FIG. 1A.

As described above, the implementation of mount options in the present invention is utilized with the response of the rmmount operation to insert calls from the volume manager 12. The rmmount operation 10 in FIG. 1A is illustrated in FIG. 1B, where the operation begins with parse module 28 scanning the lines in rmmount configuration file 22. In the present invention, the configuration file lines, or entries, of interest are mount lines so parse module 28 will scan all the entries and for each mount line call the configuration mount (conf_mount) module 30.

Conf_mount module 30 builds a mount data structure from the mount entries in configuration file 22 created by the user. Each mount entry in the configuration file 22 provides a media pattern identifier, zero or more file system type identifier(s) (fstype) and the option(s) for the attached file system. The mount entry takes the form—"mount [pattern] [fstype1 fstype2]-o option1 option2 ... optionN". The "-o" is an option mark and indicates the beginning of the option arguments in the mount entry. Conf_mount verifies the fstype and option entries in the mount entry and creates a mount data structure array. Conf_mount writes a pattern entry as a row in the mount data structure array for each mount entry in the configuration file. The pattern entry takes the form—"PatternID" "fstype1" "fstype2" "option1" "option2" ... "optionN". Each invocation of the conf_mount builds one entry in this array.

When a mount command is to be executed, hard mount 32 looks for the pattern entry in the mount data structure to find the pattern entry whose PatternX matches PatternX in the command to be executed. Hard mount then checks the compatibility of the programmed options with the programmed file system types (fstypes) in that pattern entry. If they check ok, hard mount sets option flags for use in building a mount command for the media identified by the media pattern identifier, PatternID. If fstype and options are compatible, hard mount sets appropriate flags for the options.

Build mount command operation 34 responds to the flags set by hard mount and builds a mount command with the correct data strings to implement the options. The mount command is passed to the attach operation 36 where the file system of media is attached to the file system in the computing system in accordance with the conditions specified by the programmable options defined in the configuration file by the user.

Figure 2:
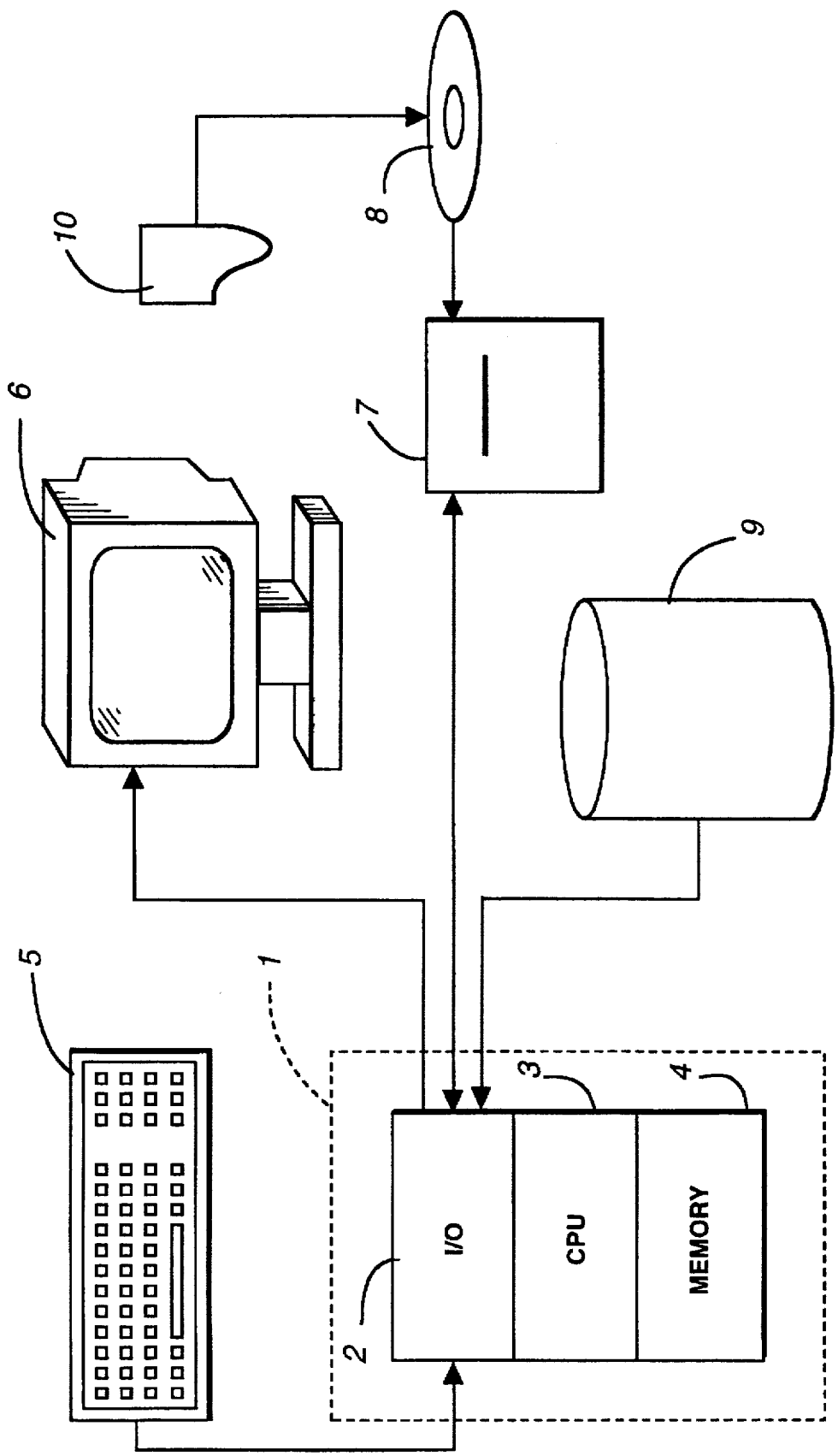
FIG. 2 illustrates a computing system to perform the computer implemented steps in accordance with the invention.

The logical operations described above relative to FIGS. 1A and 1B are performed in a preferred embodiment of the invention in the computer system shown in FIG. 2. The computing system is a general, distributed processing computing system, wherein general purpose computers, workstations, or personal computers are connected via communication links of various types, in a client-server arrangement, wherein programs and data, many in the form of objects, are made available by various members of the system. Some of the elements of a general purpose workstation computer are shown in FIG. 2, wherein a processor 1 is shown, having an input/output (I/O) section 2, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system. Examples of such systems include SPARC™ systems offered by Sun MicroSystems, Inc., personal computers offered by IBM Corporation and by other manufacturers of IBM-compatible personal computers, and systems running the UNIX operating system.

Figures 3, 4:
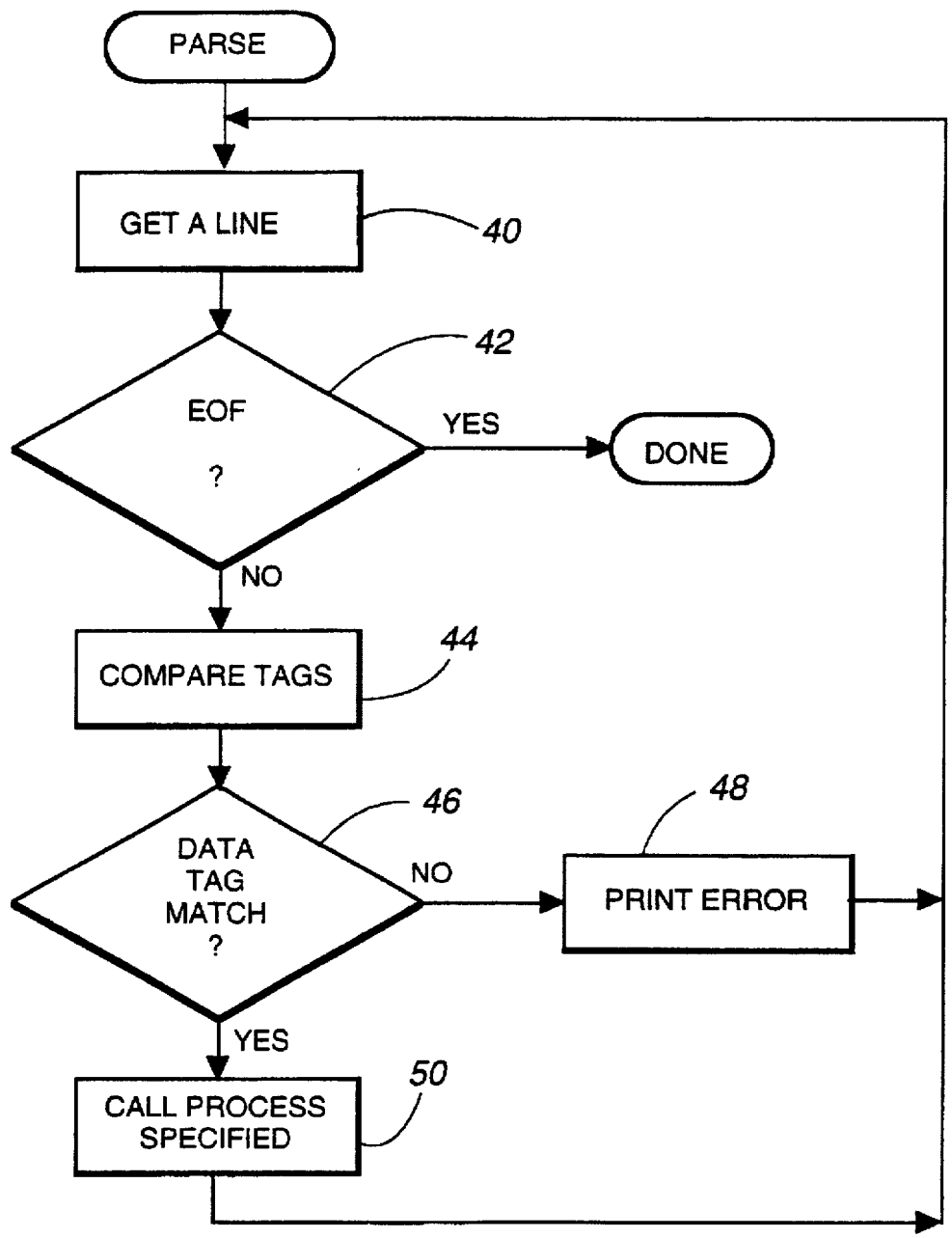
FIG. 3 shows the logical operations of the parse module 28 in FIG. 1B.
FIG. 4 shows the configuration process tag table used by operation 44 in FIG. 3.

The logical operations of parse module 28 of FIG. 1B are shown in FIG. 3 and begin at operation 40. Operation 40 retrieves a configuration entry from the configuration file 22 (FIG. 1A). Decision operation 42 then checks to see if there is an entry in the configuration file. If there is no entry, then the end of the configuration file has been reached, and the parse operation is complete. If a configuration entry was retrieved, operation 44 compares the entry tag to possible configuration tags. If there is no match between the tag in the configuration entry and the possible tags recognized by the rmmount, decision operation 46 branches "no" to step 48. Step 48 prints an error condition to flag the improper entry in the configuration file 22 (FIG. 1A). If decision operation 46 does detect a tag match, the operations branch "yes" to logical operation 50 to call the operation specified by the tag.

The table in FIG. 4 indicates the possible tags that are being checked against the entry tags by steps 44 and 46 of FIG. 3. For each tag there is a "conf_xxxx" operation indicated in the table of FIG. 4 that is called by step 50 of FIG. 3. In the preferred embodiment of the present invention the tag and operation of interest are "mount" and "conf_mount" at line 52 of the table in FIG. 4.

The conf_mount operation builds a mount options data structure for use by the hard mount operation. As discussed above for the configuration file 22 in FIG. 1A, the configuration file will contain a mount entry that looks like "mount [pattern] [fstype] [options]". The conf_mount operation, when called by step 50 in FIG. 3, will strip off the mount tag and save in a data array structure a line having the pattern identifier [pattern] from the mount configuration entry along with the [fstypes] and [options] associated with that pattern. Accordingly, if there are a number of mount entries in the configuration file, the parse operation in FIG. 3, and the conf_mount operation will build a mount data structure that is an array containing a list of patterns and their associated [fstypes] and [options].

Figure 5:
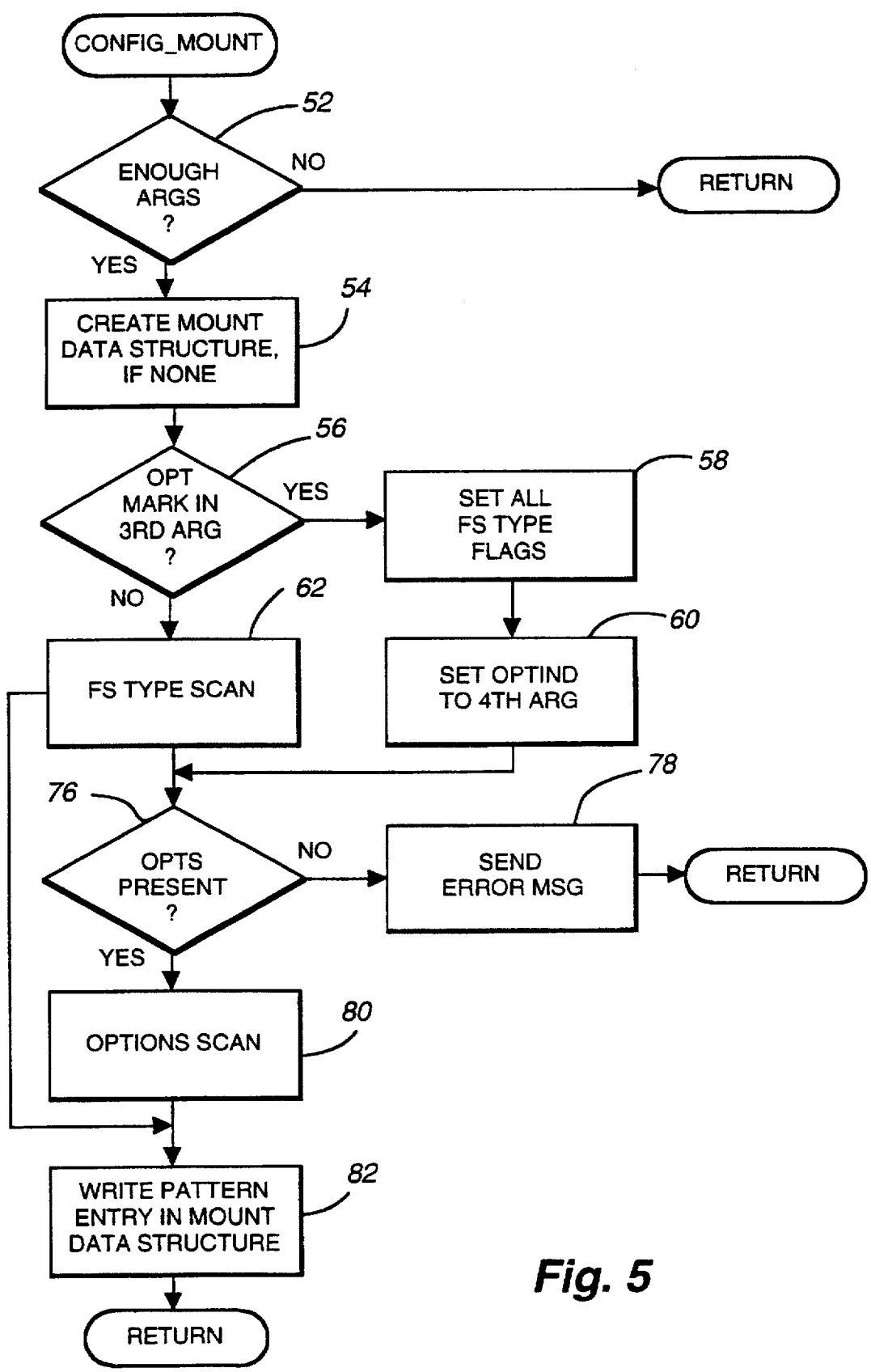
FIG. 5 shows the logical operations of the conf_mount operation 30 in FIG. 1B.

FIG. 5 illustrates the logical operations performed by a conf_mount module to verify data and build a mount data structure. The mount data structure is an array with each row in the array formatted as "Pattern" "fstype(s)" "option1" "option2" . . . "optionN". Each invocation of conf_mount can build one entry or row in this array.

Conf_mount begins at decision operation 52 which tests whether there are enough arguments in the mount entry from the configuration file. There should be at least three arguments—mount, pattern and fstype or option. If there are not enough arguments, the flow of operations returns to operation 40 (FIG. 3); otherwise create operation 54 creates a mount data structure if the structure does not already exist.

Decision operation 56 then detects whether the third argument is an option mark (i.e. "-o"). If it is, the fstype entry for the pattern entry row is set to "all" fstypes by operation 58. Operation 60 then sets the option index number to the fourth argument, and the operation flow passes to decision operation 76 to detect if an option is present at the fourth argument of the mount entry.

If the third argument is not an option mark, it must be a fstype. Therefore, the flow of operations branches "yes" from decision operation 56 to fstype scan module 62. Module 62 retrieves and verifies fstype entries from the mount entry being operated on.

Figure 6:
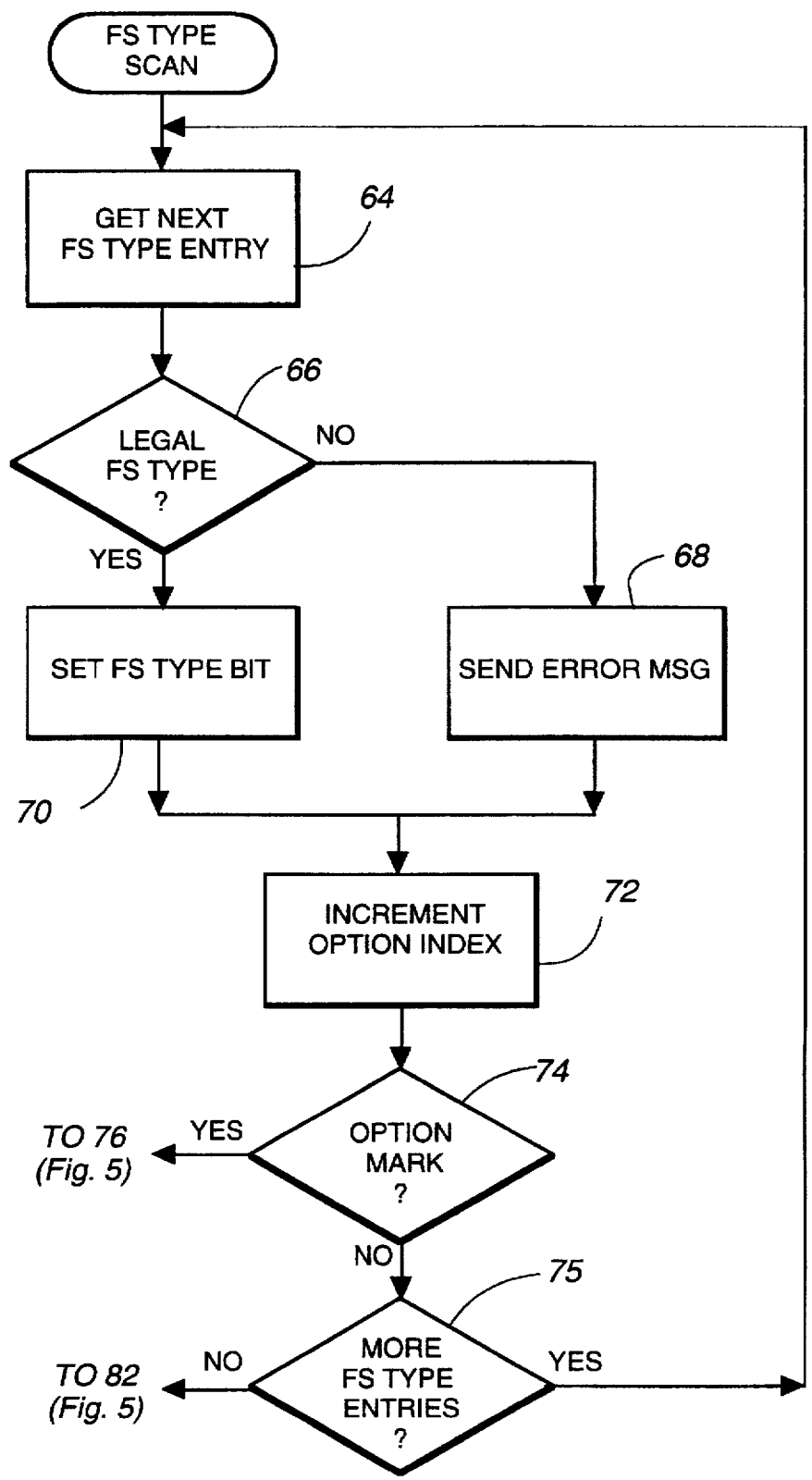
FIG. 6 shows the logical operations of the FSType Scan operation 62 in FIG. 5.

In FIG. 6, fstype scan begins with operation 64 getting the next fstype entry, in this case the first fstype entry, from the mount entry. Decision operation 66 then tests whether the fstype entry is legitimate by comparing the fstype identified in the fstype entry to a list of legal or correct fstypes. If the fstype is not legal, operation 68 sends an error message. If the fstype is legal, operation 70 sets the appropriate fstype flag to be used by the pattern entry in the mount data structure. In either event, operation 72 then increments the option index by one. Then decision operation 74 checks for the option mark "-o". If the option mark is found, the operation flow branches "Yes" to decision operation 76 (FIG. 5) to check for options present in the mount entry, i.e. not at the end of list of arguments for mount entry. If the option mark is not detected by decision operation 74, the next argument, if any, must be a fstype. Decision operation 75 detects if there are more fstype entries, i.e. not at the end of list for arguments of the mount entry. If there are more fstype entries, the operation flow branches back to operation 64 to get the next fstype entry in the mount entry. This fstype entry is then verified by operation 66. If the end of the argument list for the mount entry is found, flow of operations branches "no" to write operation 82 (FIG. 5). At this point in the operation flow the fstype entries in the mount entry of the configuration file have been scanned and checked for validity.

In FIG. 5 decision operation 76 detects whether options are present. Decision operation 76 is reached only if an option mark has been detected at decision operation 56 or decision operation 74 (FIG. 6). Therefore, if decision operation 76 detects no options present, there is an error. Operation 78 sends an error message, and the operation flow returns to operation 40 in FIG. 3. Normally, operation 76 detects that the operation is not at the end of the list of arguments for the mount entry, i.e. options are present in the mount entry. Options scan module 80 then scans the options to verify that each option is legal.

Options scan module 80 operates in the same manner as the fstype scan module 62 with two exceptions. Option scan compares each option to a list of legal options rather than a list of legal fstypes as was done for fstype scan. Also, option scan detects that all options have been scanned by detecting the end of the argument list for the mount entry rather than detecting an option mark or the end of argument list as was done for fstype scan.

At this point in the operation flow all arguments of the mount entry have been processed. Write pattern entry module 82 then writes a pattern entry as a row in the mount data structure for the mount entry just processed. For example, if the mount entry is "mount pattern fstype1 fstype2 -o option", module 82 writes the pattern entry in the mount data structure as "pattern" "fstype1" "fstype2" "option". After the pattern entry is written to the mount data structure, the operation flow returns to operation 40 (FIG. 3) in the parse module to get the next entry from the configuration file.

In FIG. 3, operation 40 retrieves the next entry, and operation 42 detects the end of the configuration file if there are no more entries in the file. The parse module is now complete, and the mount data structure has been built for all mount entries in the configuration file 22. The flow of operations now passes to hard mount module.

Figure 7:
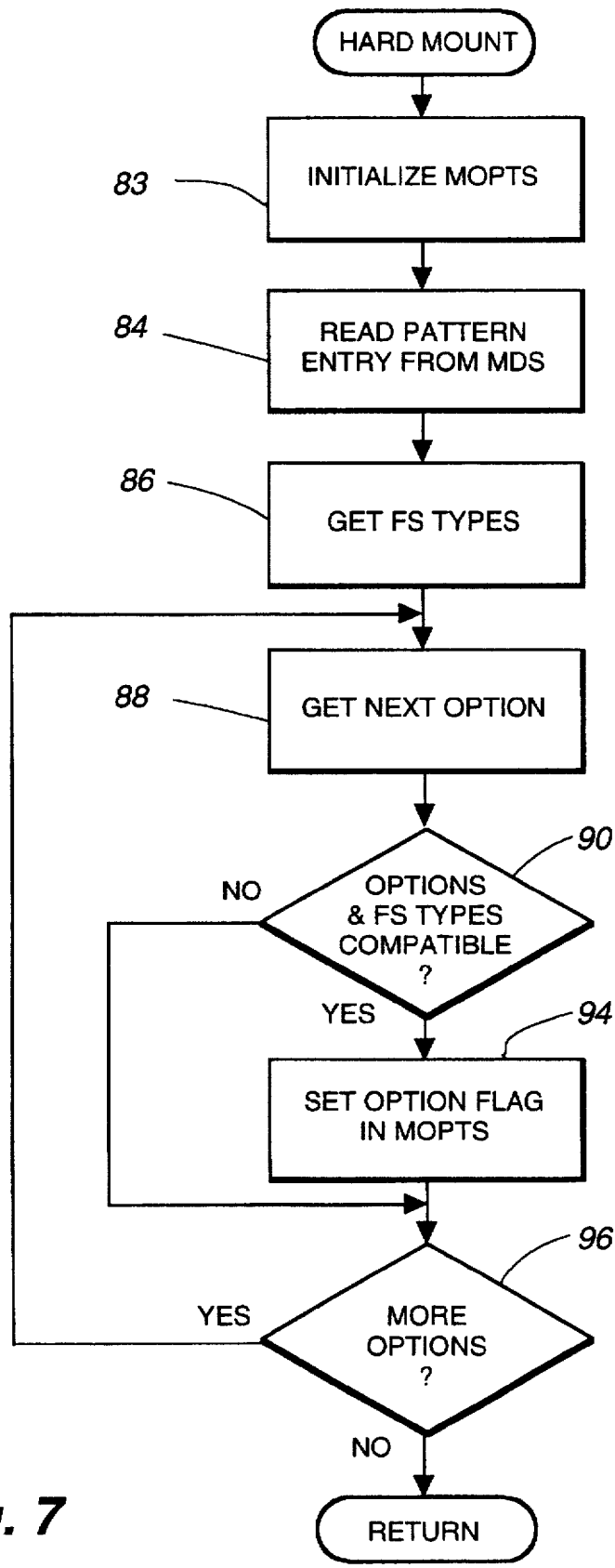
FIG. 7 shows the logical operations of the hard mount operation 32 in FIG. 1B.

In FIG. 7, the hard mount operation begins at initialize operation 83. Operation 83 initializes all the mount options flags (MOPTS) to a reset state, usually zero. Operation 84 then retrieves the pattern entry in mount data structure corresponding to the pattern in the mount command to be executed. From the pattern entry, the fstypes and the first option are read by operations 86 and 88, respectively. Decision operation 90 checks the option against the fstypes to verify that the option, programmed into the configuration file by the user, is compatible with the fstypes. If the option is not compatible, it is skipped. The operation flow branches "no" from decision operation 90 to operation 96 to check for more options. If the option is compatible, a flag for the option is set in MOPTS by set operation 94. Then, decision operation 96 tests for more options in the pattern entry of the MDS. If there is another option entry, the flow of operations branches back to operation 88 to get the next option. When all options have been verified and set as flags in MOPTS, decision operation 96 will detect no more options in the pattern entry. The operation flow branches "no" from decision operation 96 to build media mount command operation 34 in FIG. 1B.

Build media mount command operation 34 converts the option flags in MOPTS to data strings. The mount command with these option data strings is passed to mount operation 24. The file system of the transportable medium is then attached to the computer's file system with the conditions specified by the option data strings.

While the invention has been particularly shown and described with reference to a preferred embodiment thereof, it will be understood by those skilled in the art that various other changes in the form and details may be made therein without departing from the spirit and scope of the invention.

What is claimed is:

1. A method for verifying programmable options compatibility with file system types in attaching a media file system to an existing file system in a computing system, said media file system on media being mounted on the computing system, said method comprising the steps of:

reading a mount entry from a configuration file, the mount entry defining file system types for the media file system and programmable options controlling operation of the computing system with the media file system;

verifying the file system types, the programmable options and the compatibility of the programmable options with the file system types;

creating a mount command to attach the media file system to the existing file system and an option string in the command from the programmable options verified by said verifying step; and executing the command with option string to attach the media file system to the existing file system so that the computing system operates with the media file system in accordance with verified programmable options.

2. The method of claim 1 wherein said verifying step comprises the steps of:

first comparing the file system type from the mount entry to a list of valid file system types and indicating the file system type as a legal file system type if the file system type matches one of the valid file system types;

second comparing the programmable option from the mount entry to a list of valid programmable options and indicating the programmable option as a legal programmable option if the programmable option matches one of the valid programmable options;

third comparing the legal programmable option against the legal file system type to verify that the programmable option is compatible with the legal file system type.

3. The method of claim 1 wherein said verifying step comprises the steps of:

comparing the file system types and the programmable options to legal file system types and legal programmable options to produce verified file system types from the mount entry and verified programmable options from the mount entry;

checking each verified programmable option from the mount entry against all verified file system types from the mount entry to determine that each verified programmable option is compatible with at least one of the verified file system types.

4. The method of claim 3 wherein said comparing step comprises the steps of:

getting each file system type from the mount entry;

type comparing each file system type to a list of legal file system types and producing a verified file system type for each file system type that matches a legal file system type;

getting each programmable option from the mount entry;

option comparing each programmable option to a list of legal programmable options and producing a verified programmable option for each programmable option that matches a legal programmable option;

writing a pattern entry in a mount data structure for each mount entry, said pattern entry having a pattern identifier from the mount entry, verified file system types and verified programmable options produced from the mount entry by said type comparing step and said option comparing step.

5. The method of claim 4 wherein said checking step comprises the steps of:

reading the pattern entry from the mount data structure;

getting all of the verified file system types from the pattern entry;

getting each verified programmable option from the pattern entry;

testing the compatibility of each verified programmable option with all of the verified file system types and producing a compatible option for said creating step to convert to a option string in the command to attach the media file system to the existing file system.

6. Apparatus for compatibility checking programmable options with file system types when attaching a media file system to an existing file system in a computer, the computer having a processor, input/output devices, and a plurality of data storage devices, said processor having a central processing unit, memory and input/output control, said input/output control connected to the input/output devices and data storage devices, said apparatus comprising:

a parse module scanning a configuration file to read mount entries from the configuration file;

a configuration mount module building a mount data structure from the mount entries read by said parse module, said mount data structure having a pattern entry for each mount entry and each pattern entry having a pattern identifier, and at least one verified file system type and at least one verified programmable option;

a hard mount module setting a mount option indicator for each verified programmable option in a pattern entry if the verified programmable option is compatible with at least one of the verified file system types in the pattern entry whereby a mount command can be created to attach the media file system associated with the pattern entry in accordance with programmable options indicated by the mount option indicators.

7. The apparatus of claim 6 wherein said configuration mount module comprises:

type scan module scanning the file system types in a mount entry to detect if each file system type is a legal file system type;

option scan module scanning the programmable options in a mount entry to detect if each programmable option is a legal programmable option;

a write module writing into memory a pattern entry for each mount entry, said pattern entry comprising a pattern identifier from the mount entry, verified file system types detected as a legal file system type from the mount entry by said type scan module and verified programmable options detected as legal programmable options from the mount entry by said option scan module.

8. The apparatus of claim 7 wherein said hard mount module comprises:

a retrieve module retrieving all the verified file system types and each verified programmable option from the pattern entry;

a testing module checking the compatibility of each verified programmable option retrieved from the pattern entry with all the verified system types from the pattern entry; and an option setting module for setting an option indicator for each programmable option compatible with at least one of the verified file system types.

9. A computer program storage medium readable by a computing system and encoding a computer program of instructions for executing a computer process for verifying programmable options compatibility with file system types in attaching a media file system to an existing file system in the computing system, said computer process comprising the steps of:

reading a mount entry from a configuration file, the mount entry defining file system types for the media file system and programmable options controlling operation of the computing system with the media file system;

verifying the validity of the file system types and the programmable options;

creating a mount command to attach the media file system to the existing file system in accordance with compatible programmable options; and testing the compatibility of the programmable options from the mount entry with the file system types from the mount entry.

10. The computer program storage medium of claim 9 where in the computer program the computer process step of verifying comprises the steps of:

comparing the file system type from the mount entry to a list of valid file system types and indicating the file system type as a legal file system type if the file system type matches one of the valid file system types; and comparing the programmable option from the mount entry to a list of valid programmable options and indicating the programmable option as a legal programmable option if the programmable option matches one of the valid programmable options.

11. The computer program storage medium of claim 10 where in the computer program the computer process step of testing comprises the steps of:

checking each legal programmable option from the mount entry against all legal file system types from the mount entry to determine that each legal programmable option is compatible with at least one of the legal file system types.

12. The computer program storage medium of claim 11 where in the computer program the computer process step of verifying further comprises the steps of:

writing a pattern entry in a mount data structure for each mount entry, said pattern entry having a pattern identifier from the mount entry, legal file system types and legal programmable options produced from the mount entry by said type comparing step.

13. The computer program storage medium of claim 12 where in the computer program the computer process step of checking comprises the steps of:

getting all of the legal file system types from the pattern entry;

getting each legal programmable option from the pattern entry;

detecting the compatibility of each verified programmable option with all of the verified file system types; and setting a compatible option indicator for each verified programmable option compatible with at least on the verified file system types.

14. The computer program storage medium of claim 13 where said computer process in the computer program further comprises the step of:

executing the command with option string to attach the media file system to the existing file system so that the computing system operates with the media file system in accordance with programmable options.

* * * * *

UNITED STATES PATENT AND TRADEMARK OFFICE
CERTIFICATE OF CORRECTION

PATENT NO. : 5,721,948

DATED : February 24, 1998

INVENTOR(S) : Duncan

It is certified that error appears in the above-identified patent and that said Letters Patent is hereby corrected as shown below:

Columns 9 & 10, claim 9 should read as follows:

9. A computer program storage medium readable by a computing system and encoding a computer program of instructions for executing a computer process for verifying programmable options compatibility with file system types in attaching a media file system to an existing file system in the computing system, said computer process comprising the steps of:

reading a mount entry from a configuration file, the mount entry defining file system types for the media file system and programmable options controlling operation of the computing system with the media file system;

verifying the validity of the file system types and the programmable options;

testing the compatibility of the programmable options from the mount entry with the file system types from the mount entry; and

UNITED STATES PATENT AND TRADEMARK OFFICE
CERTIFICATE OF CORRECTION

PATENT NO. : 5,721,948

DATED : February 24, 1998

INVENTOR(S) : Duncan

It is certified that error appears in the above-indentified patent and that said Letters Patent is hereby corrected as shown below:

creating a mount command to attach the media file system to the existing file system in accordance with compatible programmable options.

Signed and Sealed this

Eleventh Day of August 1998

Attest:

BRUCE LEHMAN

Attesting Officer

Commissioner of Patents and Trademarks